US010809751B1

(12) United States Patent
Bolus et al.

(10) Patent No.: US 10,809,751 B1
(45) Date of Patent: Oct. 20, 2020

(54) CURRENT MODE POWER CONVERTER WITH SLOPE COMPENSATION ERROR CONTROL

(71) Applicant: Apple Inc., Cupertino, CA (US)

(72) Inventors: Jonathan F. Bolus, San Francisco, CA (US); Fabio Gozzini, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/508,910

(22) Filed: Jul. 11, 2019

(51) Int. Cl.
| | |
|---|---|
| *H02M 3/157* | (2006.01) |
| *G05F 1/565* | (2006.01) |
| *H02M 3/158* | (2006.01) |
| *G05F 1/46* | (2006.01) |
| *H02M 1/42* | (2007.01) |
| *H02M 3/156* | (2006.01) |
| *H02M 1/00* | (2006.01) |

(52) U.S. Cl.
CPC ............... *G05F 1/46* (2013.01); *H02M 1/42* (2013.01); *H02M 3/156* (2013.01); *G05F 1/565* (2013.01); *H02M 3/157* (2013.01); *H02M 3/158* (2013.01); *H02M 2001/0025* (2013.01)

(58) Field of Classification Search
CPC ............ G05F 1/46; G05F 1/565; H02M 1/42; H02M 3/156; H02M 2001/005; H02M 3/157; H02M 3/158
USPC ...... 323/222, 224, 282–288, 299; 363/21.02, 363/21.04, 21.15, 21.18
See application file for complete search history.

(56) References Cited

U.S. PATENT DOCUMENTS

| | | | |
|---|---|---|---|
| 7,764,054 B1 | 7/2010 | Guo et al. | |
| 8,575,911 B2 | 11/2013 | Cheng et al. | |
| 9,467,051 B2 * | 10/2016 | Stoichita | H02M 3/158 |
| 10,248,150 B2 * | 4/2019 | Narayanan | H03F 3/505 |
| 10,534,384 B2 * | 1/2020 | Manlove | G05F 1/562 |
| 2002/0125872 A1 * | 9/2002 | Groom | H02M 3/156 323/288 |
| 2004/0095111 A1 * | 5/2004 | Kernahan | H02M 1/0845 323/282 |
| 2015/0346247 A1 | 12/2015 | Mahajan et al. | |
| 2018/0083532 A1 * | 3/2018 | Gozzini | H02M 3/1584 |

\* cited by examiner

*Primary Examiner* — Gary A Nash
(74) *Attorney, Agent, or Firm* — Kowert, Hood, Munyon, Rankin & Goetzel, P.C.

(57) ABSTRACT

A power converter circuit that includes a switch node coupled to a regulated power supply node via an inductor may, during a charge cycle, source current to the regulated power supply node. In response to initiating the charge cycle, a control circuit may generate a control current using a voltage level of the regulated power supply node and a reference voltage level. The control circuit may also generate compensation and correction currents that are used with a sensed inductor current to determine when to halt the charge cycle.

20 Claims, 6 Drawing Sheets

CURRENT MODE POWER CONVERTER WITH SLOPE COMPENSATION ERROR CONTROL

BACKGROUND

Technical Field

Embodiments described herein relate to integrated circuits, and more particularly, to techniques for generating regulated power supply voltages.

Description of the Related Art

Modern computer systems may include multiple circuits blocks designed to perform various functions. For example, such circuit blocks may include processors, processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generated regulator voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments of a power converter circuit are disclosed. Broadly speaking, a power converter circuit is contemplated, in which a switch node is coupled to a regulated power supply node via an inductor. The power converter circuit may be configured to source a charge current to the switch node during a charge cycle. A control circuit may be configured, in response to an initiation of the charge cycle, generate a control current using a voltage level of the regulated power supply node and a reference voltage level. The control circuit may be further configured to generate a compensation current and a correction current, and halt the charge cycle using results of a comparison of the control current to a combination of a sensed inductor current, the compensation current, and the correction current. In another non-limiting embodiments, the control circuit may also be configured to subtract the correction current from a sum of the sensed inductor current and the compensation current.

BRIEF DESCRIPTION OF THE DRAWINGS

The following detailed description makes reference to the accompanying drawings, which are now briefly described.

Figure 1:
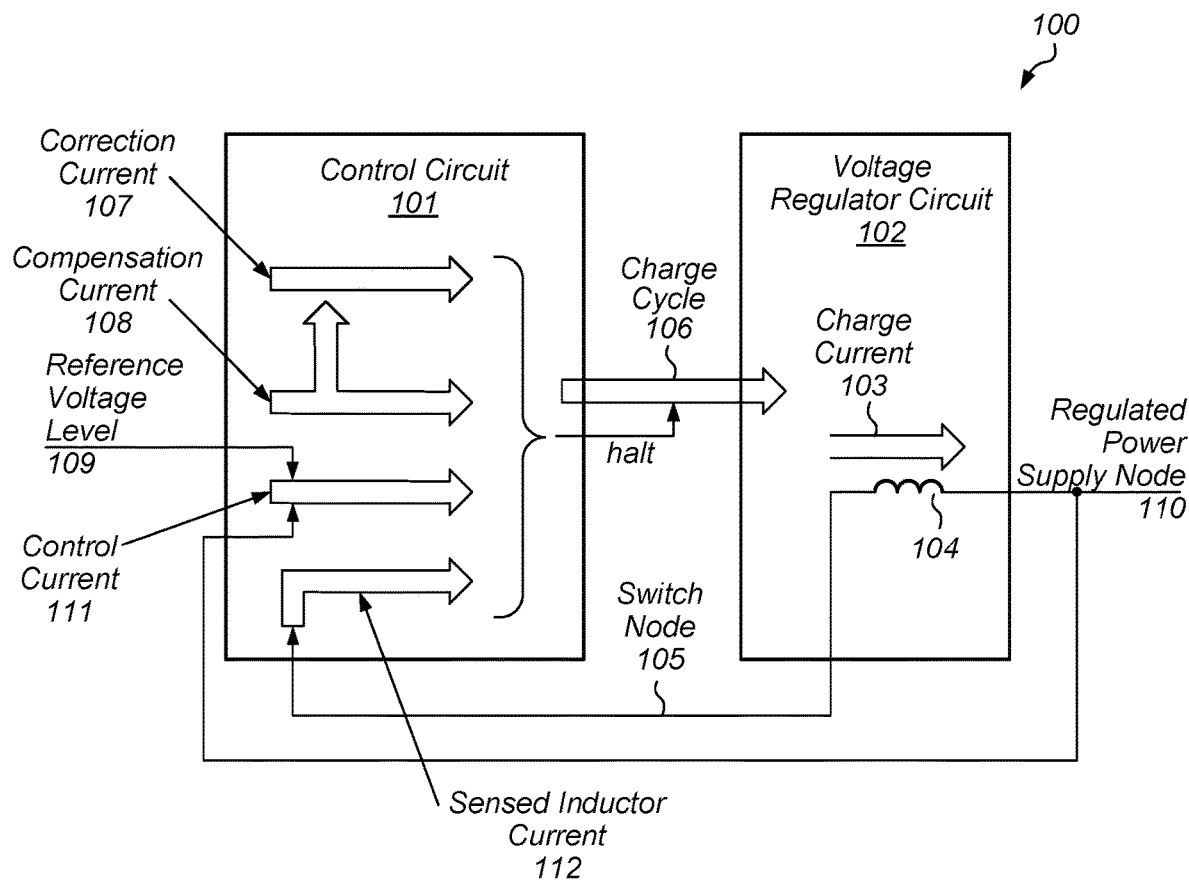
FIG. 1 illustrates a block diagram of an embodiment of a power converter circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple power converter circuits configured to generate regulated voltage levels for various power supply signals. Such power converter circuits may employ regulator circuit that includes both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such buck converter circuits include multiple devices and a switch node that is coupled to a regulated power supply node via an inductor. Particular ones of the multiple devices are then activated to periodically charge and discharge the switch node in order to maintain a desired voltage level on power supply node.

To determine the duration of either the charge cycle or discharge cycle, current mode control may be used in some power converter circuits in order to provide a desired transient response of the power converter circuit as well as balance currents in multi-phase power converter circuits. In a power converter circuit using current mode control, control circuits may generate a control current whose values is based, at least in part, on a comparison of a voltage level of the regulated power supply node and a reference voltage. The control current may then be compared to a current that is flowing through the inductor to determine the duration of the charge or discharge cycle.

In some cases, however, current mode control may result in a power converter circuit operating becoming unstable while operating in certain duty cycles. To improve the stability of the power converter circuit, slope compensation is often employed. When slope compensation is used in a power converter circuit, a ramp signal with a fixed slope is combined with the sensed inductor current prior to comparison with the control current.

While improving the stability of the power converter circuit, slope compensation may result in other problems in the operation of the power converter circuit. The inclusion of the slope compensation current results in a deviation of an ideal relationship between the control current and the sensed inductor current. This deviation may results in having to increase the dynamic range of the control current, as well as a loss of accuracy in the regulation of the voltage level of the regulated power supply node.

The embodiments illustrated in the drawings and described below may provide techniques for operating a power converter circuit using a correction current along with slope compensation. By using such a correction current, the error introduce by the slope compensation current can be reduced, thereby improving the accuracy of the regulation of the voltage level of the regulated power supply node and reducing a need for additional range of the control current.

A block diagram depicting an embodiment of a power converter circuit is illustrated in FIG. 1. As illustrated, power converter circuit 100 includes control circuit 101 and voltage regulator circuit 102.

Voltage regulator circuit 102 includes switch node 105 coupled to regulated power supply node 110 via inductor 104. In various embodiments, voltage regulator circuit 102 is configured, in response to an initiation of charge cycle 106, to source charge current 103 to switch node 105. It is noted that although a single voltage regulator circuit is depicted in the embodiment of FIG. 1, in other embodiments, multiple voltage regulator circuits (collectively "phase units" or "phase circuits") may be coupled to regulated power supply node 110, in parallel, and operated with different timings (or "phases").

As noted above, the duration of charge and discharge cycles in a power converter circuit may be determined using current control. As illustrated in FIG. 1, control circuit 101 is configured, in response to an initiation of charge cycle 106, to generate control current 111 using a voltage level of regulated power supply node 110 and reference voltage level 109. In various embodiments, control circuit 101 initiates charge cycle 106 in response to an assertion of a clock or other timing signal.

Control circuit 101 is also configured to generate compensation current 108, and correction current 107 using compensation current 108. In various embodiments, compensation current 108 may be used to perform slope compensation on sensed inductor current 112. Compensation current 108 may be an increasing ramp signal with a fixed slope that is activated in response to the assertion of the clock or other timing signal. As used herein, sensed inductor current 112 is a current that is flowing through inductor 104 during a charge cycle. In various embodiments, sensed inductor current 112 may be inferred from a voltage level of switch node 105, measured using a voltage drop across a resistor in series with inductor 104, or any other suitable circuit or technique.

As described below in more detail, control circuit 101 may be further configured to convert compensation current 108 to a voltage level. Control circuit 101 may also be configured to sample the voltage level and filter the sampled result. In various embodiments, control circuit 101 may be further configured to generate correction current 107 using the filtered version of the sampled voltage.

In addition to generating compensation current 108 and correction current 107, control circuit 101 is also configured to halt charge cycle 106 using control current 111, sensed inductor current 112, compensation current 108, and correction current 107. In various embodiments, control circuit may combine sensed inductor current 112, compensation current 108, and correction current 107, and compare a result current to control current 111. By combining correction current 107 with sensed inductor current 112 and compensation current 108, control circuit 101 may reduce errors introduced by the used of compensation current 108. As described below in more detail, control circuit 101 may be configured to subtract correction current 107 from a sum of sensed current 112 and compensation current 108.

Figure 2:
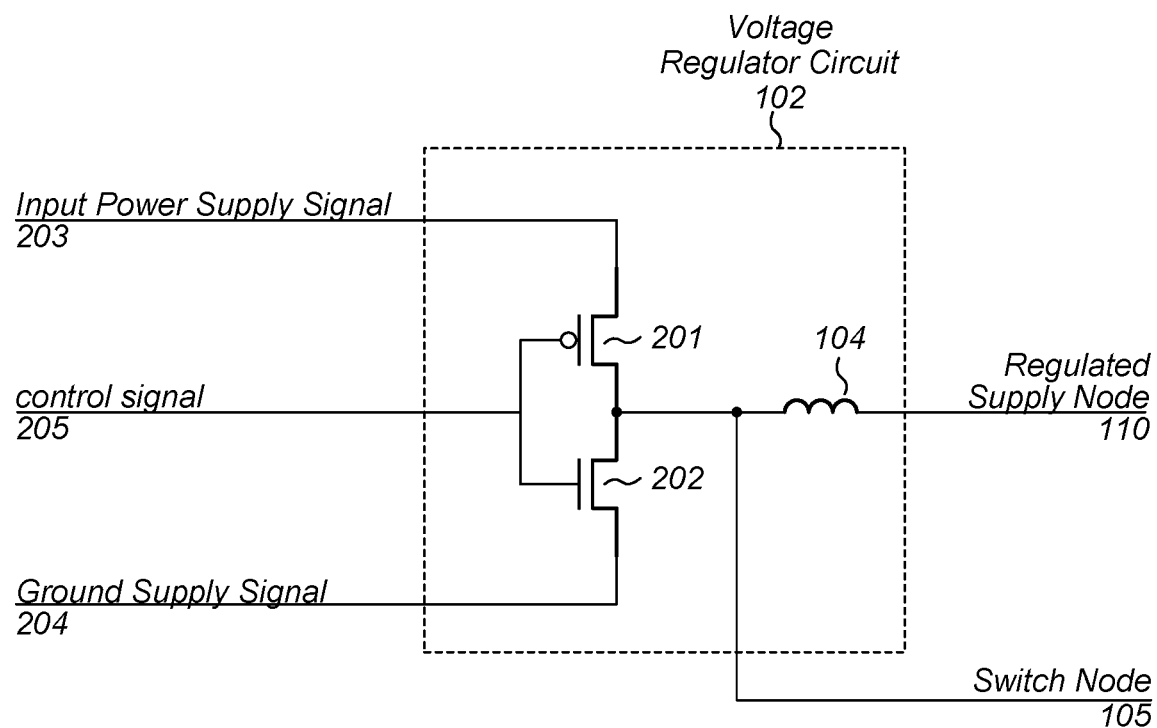
FIG. 2 illustrates schematic diagram of an embodiment of a regulator unit.

Voltage regulator circuits, such as voltage regulator circuit 102, may be designed according to one of various design styles. A schematic diagram of a particular embodiment of voltage regulator circuit 102 is depicted in FIG. 2. As illustrated, voltage regulator circuit 102 includes devices 201 and 202, which are both coupled to switch node 105, and controlled by control signal 205.

In various embodiments, control circuit 101 may generate control signal 205, which used to activate one of devices 201 and 202 during charge and discharge cycles. During a charge cycle, current is sourced from input power supply node 203 to regulated power supply node 110, and during a discharge cycle, current is sunk from regulated power supply node 110 into ground supply node 204. Alternating between charge and discharge cycles, and adjusting the duration of either of the charge or discharge cycles may maintain a desired voltage level maintained on regulated power supply node 110.

Device 201 is coupled between input power supply node 203 and switch node 105, and is controlled by control signal 205. During a charge cycle, control signal 205 is asserted, which activates device 201 and couples input power supply node 203 to switch node 105, thereby charging switch node 105 by allowing a current to flow from input power supply node 203 to switch node 105, and then onto regulated power supply node 110. As described below in more detail, the duration of the charge cycle may be based on a comparison of a generated current to a combination of generated and sensed currents.

As used herein, asserting, or an assertion of, a signal refers to setting the signal to a particular voltage level that activates a circuit or device coupled to the signal. The particular voltage level may be any suitable value. For example, in the case where device 201 is p-channel MOSFET, control signal 205 may be set to a voltage at or near ground potential when activated.

Device 202 is coupled between switch node 105 and ground supply node 204, and is also controlled by control signal 205. During a discharge cycle, control signal 205 is set to a voltage level, which activates device 202 and couples switch node 105 to ground supply node 204, thereby providing a conduction path from regulated power supply node 110 through inductor 104 into ground supply node 204. While device 202 is active, current flows from regulated power supply node 110 into ground supply node 204, decreasing the voltage level of regulated power supply node 110.

Device 201 and device 202 may be particular embodiments of MOSFETs. In particular, device 201 may be a particular embodiment of a p-channel MOSFET and device 202 may be a particular embodiment of an n-channel MOSFET. Although only two devices are depicted in the embodiment of FIG. 2, in other embodiments, any suitable number of devices, coupled in series or parallel, may be employed to achieve particular electrical characteristics (e.g., on-resistance of the devices).

Figure 3:
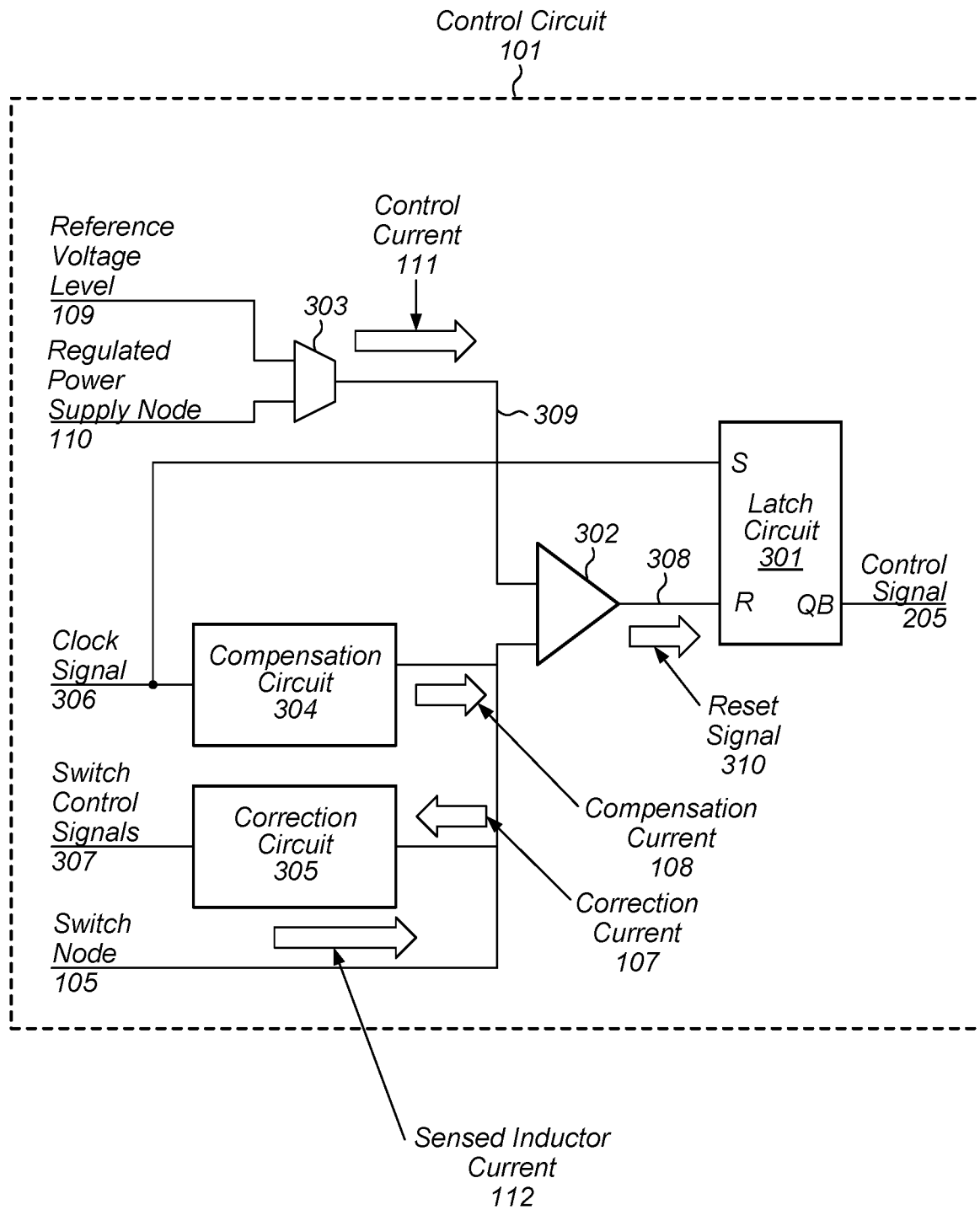
FIG. 3 illustrates a block diagram of an embodiment of a control circuit for a power converter circuit.

A block diagram of an embodiment of control circuit 101 is depicted in FIG. 3. As illustrated, control circuit 101 includes latch circuit 301, comparator circuits 302 and 303, compensation circuit 304, and correction circuit 305.

Latch circuit 301 may be a particular embodiment of a Set-Reset (SR) latch configured to set control signal 205 to a low logic value in response to an assertion of clock signal 306. Additionally, Latch circuit 301 is configured to set control signal 205 to a high logic level in response as assertion of reset signal 310 on node 308.

Latch circuit 301 may be designed according to one of various design style. In various embodiments, latch circuit 301 may include multiple logic gates, such as, cross-coupled NAND gates, or any other suitable combination of logic gates and/or MOSFETs to implement the functionality described above.

Comparator circuit 302 is coupled to latch circuit 301 via node 308, and may be a particular embodiment of a differential amplifier configured to generate reset signal 310 on node 308 using control current 101 and a combination of compensation circuit 108, correction current 107, and sensed inductor current 112. In various embodiments, comparator circuit 302 may be configured to set reset signal 310 to particular digital voltage level using results of comparing control current 111 to the combination of compensation current 108, correction current 107, and sensed inductor current 112. For example, when a value of control current 111 is substantially the same as the combination of compensation current 108, correction current 107, and sensed inductor current 112, comparator circuit 301 may set the voltage level of reset signal 310 to a voltage level corresponding to a high logic level.

Comparator circuit 303 is coupled to comparator circuit 301 via node 309, and may be a particular embodiment of a transconductance amplifier configured to generate control current 111 in node 309. The value of control current 111 may be based, at least in part, on a comparison of reference voltage level 109 and the voltage level of regulated power supply node 110. In various embodiments, comparator circuit 303 may amplify a difference between reference voltage level 109 and the voltage level of regulated power supply node 110, and convert the difference in voltage levels to control current 111.

Compensation circuit 304 is coupled to clock signal 306 and switch node 105, and is configured to generate compensation current 108. In various embodiments, compensation circuit 304 is configured to generate compensation current 108 in response to an assertion of clock signal 306. Compensation circuit 304 may be further configured to source (or add) compensation current 304 to sensed inductor current 112 to generate a sum of the two currents.

As noted above, compensation circuit 304 may be configured to generate compensation current 108 using a fixed slope. Compensation circuit 304 may be configured to generate compensation current 108 such that a value of compensation current 108 is proportional to a time from an assertion of clock signal 306. An example of the relationship for generating compensation current 108 is depicted in Equation 1, where $i_{compensation}$ is the time-domain value of compensation of compensation current 108, $m_{sc}$ is the fixed slope, and t is time. In various embodiments, when latch circuit 301 is reset, compensation circuit 304 may be configured to reset the value of compensation current 108 to at or near zero amperes.

$$i_{compensation}(t) = m_{sc} t \tag{1}$$

Correction circuit 305 is coupled to comparator circuit 302 and switch node 105, and is configured to generate correction current 107 using switch control signals 307. It is noted that switch control signals 307 may generated internal to control circuit 101, or may be received by a circuit external to control circuit 101. Although depicted as a circuit block separate from compensation circuit 304, in other embodiments, correction circuit 305 may be included in compensation circuit 304.

As described below in more detail, correction circuit 305 may be configured to convert compensation current 108 into a voltage level, which is sampled and filtered. In various embodiments, correction circuit 305 is further configured to generate correction current using the sampled and filtered voltage level. Correction circuit 305 may also be configured to sink (or subtract) correction current 107 from switch node 105.

Figure 4:
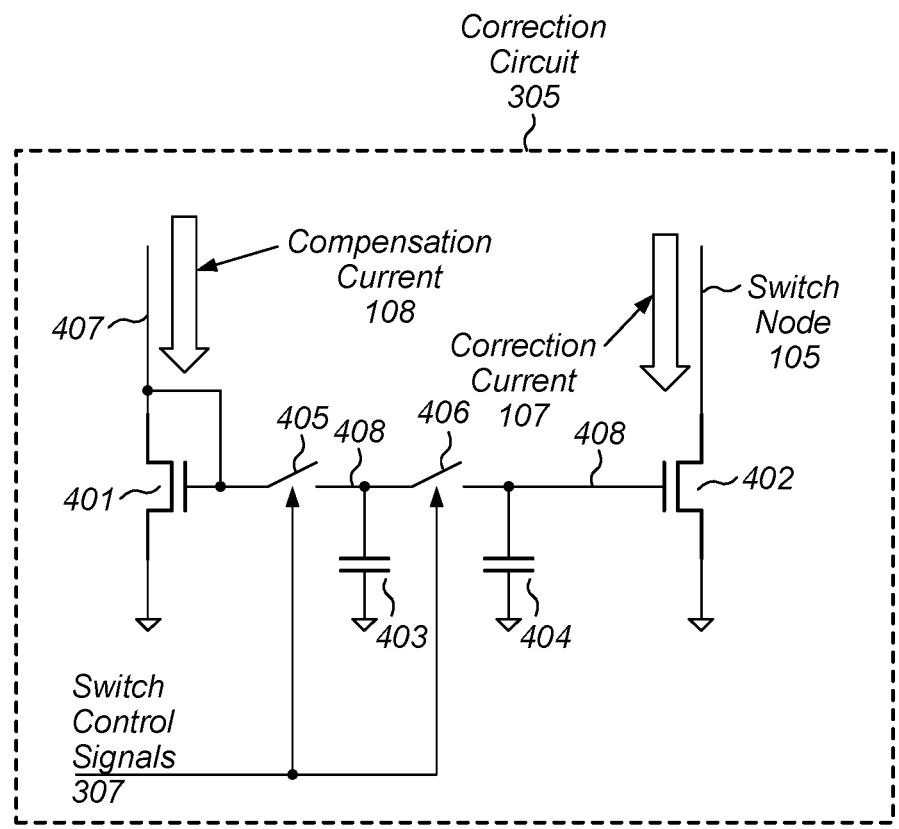
FIG. 4 illustrates a block diagram of an embodiment of a correction circuit.

The generation of correction current 107 may be accomplished using a variety of circuit designs. A particular embodiment of such a circuit is depicted in FIG. 4. As illustrated, correction circuit 305 includes devices 401 and 402, capacitors 403 and 404, and switches 405 and 406.

Device 401, which may be a particular embodiment of an n-channel MOSFET, is coupled between a ground node and node 407. In various embodiments, node 407 is coupled to compensation circuit 108 such that compensation current 108 flows through node 407. The control terminal of device 401 is also coupled to the node 407. Device 401 is configured to convert compensation current 108 to a voltage level on node 407.

Device 402, which may be a particular embodiment of an n-channel MOSFET, is coupled between switch node 105 and a ground node. The control terminal of device 402 is coupled to node 409. A value of correction current 107 is determined, at least in part, on a voltage level of node 409. As illustrated, device 402 is configured to sink (or subtract) correction current 107 from switch node 105. It is noted that, in various embodiments, the transconductances of devices 401 and 402 are matched as mismatch between the transconductances of the two devices may result in a DC gain error within the current control loop of power converter circuit 100.

Capacitors 403 and 404, and switches 405 and 406 may, in various embodiments, form a discrete time low-pass filter that is configured to sample, and then filter, the voltage level of node 407. A possible implementation of discrete time low-pass filter is illustrated in Equation 2, where $i_{comp}$ is compensation current 108, $i_{cor}$ is correction current 107, n is the sample number, and M is ratio of the value of capacitor 404 to the value of capacitor 403. To implement the discrete time low-pass filter, switches 405 and 406 are closed one at a time. Fore example, when switch 405 is closed, switch 406 is open, and when switch 406 is closed switch 405 is open. This may, in some embodiments, be accomplished by generating at least two of switch control signals 307 such that the at least two switch control signals are non-overlapping. In some cases, to reduce the settling time of the low-pass filter, switches 405 and 406 may be closed at substantially the same time during an initial cycle of operation.

$$i_{cor}(n) = i_{comp}(n-1)\frac{1}{1+M} + i_{cor}(n-1)\frac{M}{1+M} \quad (2)$$

Switch 405 is coupled between nodes 407 and 408 and is configured to selectively couple node 407 to node 408 using switch control signals 307. When switch 405 is closed, node 407 is coupled to node 408 allowing capacitor 403 to charge to the voltage level of node 407, thereby sampling the voltage level of node 407.

Switch 406 is coupled between nodes 408 and 409, and is configured to selectively couple node 408 to node 409 using switch control signals 307. When switch 406 is closed, node 408 is coupled to node 409, allowing charge stored on node 408 to transfer to node 409. The amount of charge transferred may be based, at least in part, on relative values of capacitors 403 and 404. In various embodiments, the ratio of the sizes of capacitors 403 and 404 may be selected to adjust the bandwidth of correction circuit 305 such that it does not interfere with the stability of power converter circuit 100.

In various embodiments, switches 405 and 406 may be particular embodiments of a transmission gate or other suitable combination of MOSFETs configured to selectively coupled node 407 to node 408, and node 408 to 409, respectively.

Capacitor 403 is coupled between node 408 and a ground node. When switch 405 is closed, capacitor 403 is charged to the voltage level of node 407. When switch 406 is closed, charge sharing occurs between capacitor 403 and 404. When switch 406 opens, the voltage across capacitor 404 is used by device 402 to generate correction current 107. Both capacitor 403 and capacitor 404 provide low impedances to ground for signals over respective cutoff frequencies, thereby filtering the voltage levels on nodes 408 and 409. In various embodiments, values of capacitors 403 and 404 may be selected to achieve desired cutoff frequencies.

In various embodiments, capacitors 403 and 404 may be fabricated using a metal-oxide-metal structure, or any other suitable structure available on a semiconductor manufacturing process using to fabricate power converter circuit 100.

Structures such as those shown in FIGS. 2-4 for generating a voltage level on a regulated power supply node may be referred to using functional language. In some embodiments, these structures may be described as including "a means for sourcing a charge current to the switch node during a charge cycle," "a means for, in response to an initiation of the charge cycle, generating a control current using a voltage level of the regulated power supply node and a reference voltage level," "a means for generating a compensation current," "a means for generating a correction current using the compensation current" and "a means for halting the charge cycle using results of a comparison of the control current to a combination of a sensed inductor current, the compensation current, and the correction current."

The corresponding structure for "means for sourcing a charge current to the switch node during a charge cycle" is voltage regulator circuit 102 as well as equivalents of this circuit. The corresponding structure of "means for, in response to an initiation of the charge cycle, generating a control current using a voltage level of the regulated power supply node and a reference voltage level" is comparator circuit 303 and its equivalents. The corresponding structure for "a means for generating a compensation current" is compensation circuit 304 and its equivalents, and the corresponding structure for "a means for generating a correction current using the compensation current" is correction circuit 305 as well as equivalents of this circuit. Latch circuit 301 and comparator circuit 302, and their equivalents are the corresponding structure for "means for halting the charge cycle using results of a comparison of the control current to a combination of a sensed inductor current, the compensation current, and the correction current."

Figure 5:
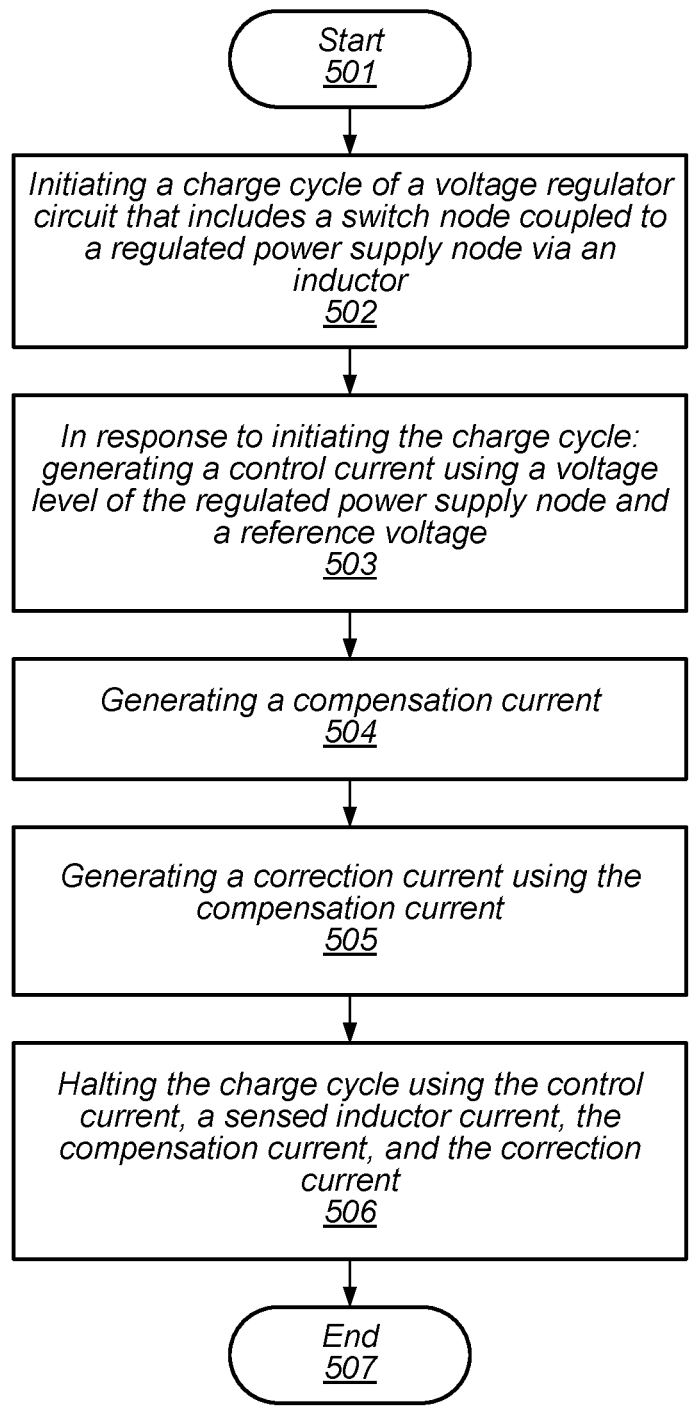
FIG. 5 illustrates a flow diagram depicting an embodiment of a method for operating a power converter circuit.

Turning to FIG. 5, a flow diagram depicting an embodiment of a method for operating a power converter circuit is illustrated. The method, which may be applied to power converter circuit 100 as depicted in FIG. 1, begins in block 501.

The method includes initiating a charge cycle of a voltage regulator circuit that includes a switch node coupled to a regulated power supply node via an inductor (block 502). In various embodiments, the method may include initiating the charge cycle in response to an assertion of a clock signal. In some cases, the method may also include setting a latch circuit using the clock signal and generating a control signal using an output of the latch circuit.

The method also includes, in response to initiating the charge cycle, generating a control current using a voltage level of the regulated power supply node and a reference voltage (block 503). In some embodiments, the method may include amplifying a difference between the voltage level of the regulated power supply node and the reference voltage level to generate the control current.

The method further includes generating a compensation current (block 504). The method may include, in some cases, generating the compensation current in response to asserting a clock signal. In some embodiments, the method may include increasing a value of the compensation current over a particular period of time.

The method also includes generating a correction current using the compensation current (block 505). In some cases, the method may include converting the compensation current to a first voltage level, and sampling the first voltage level during a first time period to generate a sampled voltage level. The method may also include filtering, during a second time period, the sampled voltage level to generate a second voltage level, and generating the correction current using the second voltage level. In some cases, the method may also include initializing the correction current during a particular cycle of the clock signal.

The method further includes halting the charge cycle using the control current, a sensed inductor current, the compensation current, and the correction current (block 506). In various embodiments, the method may include subtracting the correction current from a sum of the sensed inductor current and the compensation current, and comparing a resultant current to the control current. The method concludes in block 507.

Figure 6:
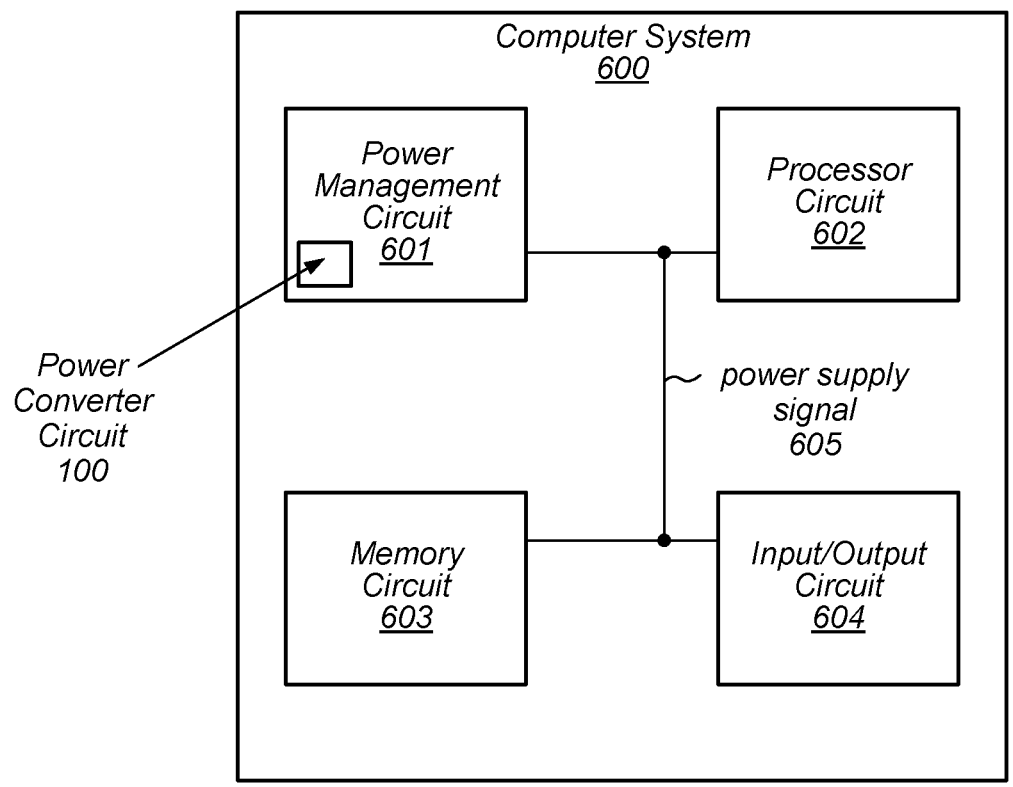
FIG. 6 depicts a block diagram of a computer system.

A block diagram of computer system is illustrated in FIG. 6. In the illustrated embodiment, the computer system 600 includes power management circuit 601, processor circuit 602, memory circuit 603, and input/output circuits 604, each of which is coupled to power supply signal 605. In various embodiments, computer system 600 may be a system-on-a-chip (SoC) and/or be configured for use in a desktop computer, server, or in a mobile computing application such as, e.g., a tablet, laptop computer, or wearable computing device.

Power management unit 601 includes power converter circuit 100, which is configured to generate a regulated voltage level on power supply signal 605 in order to provide power to processor circuit 602, memory circuit 603, and input/output circuits 804. Although power management unit 601 is depicted as including a single power converter circuit, in other embodiments, any suitable number of power converter circuits may be included in power management unit 601, each configured to generate a regulated voltage level on a respective one of multiple internal power supply signals included in computer system 600. In cases where multiple power converter circuits are employed, two or more of the multiple power converter circuits may be connected to a common set of power terminals that connections to power supply signals and ground supply signals of computer system 600.

Processor circuit 602 may, in various embodiments, be representative of a general-purpose processor that performs computational operations. For example, processor circuit 602 may be a central processing unit (CPU) such as a microprocessor, a microcontroller, an application-specific integrated circuit (ASIC), or a field-programmable gate array (FPGA).

Memory circuit 603 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although in a single memory circuit is illustrated in FIG. 6, in other embodiments, any suitable number of memory circuits may be employed.

Input/output circuits 604 may be configured to coordinate data transfer between computer system 600 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 804 may be configured to implement a version of Universal Serial Bus (USB) protocol or IEEE 1394 (Firewire®) protocol.

Input/output circuits 604 may also be configured to coordinate data transfer between computer system 600 and one or more devices (e.g., other computing systems or integrated circuits) coupled to computer system 600 via a network. In one embodiment, input/output circuits 604 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 804 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a voltage regulator circuit that includes a switch node coupled to a regulated power supply node via an inductor, wherein the voltage regulator circuit is configured to source a charge current to the switch node during a charge cycle; and
   a control circuit configured to:
      in response to an initiation of the charge cycle:
         generate a control current using a voltage level of the regulated power supply node and a reference voltage level;
         generate a compensation current;
         convert the compensation current into a correction voltage;
         sample and filter the correction voltage to generate a filtered correction voltage; and
         generate a correction current using the filtered correction voltage; and
      halt the charge cycle using the control current, a sensed inductor current, the compensation current, and the correction current.

2. The apparatus of claim 1, wherein the control circuit is further configured to subtract the correction current from a sum of the sensed inductor current and the compensation current.

3. The apparatus of claim 1, wherein to convert the compensation current into the correction voltage, the control circuit is further configured to:
   generate a first voltage level using the compensation current; and
   charge a first capacitor, using the first voltage level, during a first time period to generate a sampled voltage level.

4. The apparatus of claim 3, wherein the control circuit is further configured:
   filter, using a second capacitor, the sampled voltage level to generate the filtered correction voltage; and
   generate the correction current using the filtered correction voltage.

5. The apparatus of claim 1, wherein the control circuit is further configured to amplify a difference between the voltage level of the regulated power supply node and the reference voltage level to generate the control current.

6. The apparatus of claim 1, wherein the control circuit is further configured, during an initial cycle, to initialize a value of the correction current to a value of the compensation current.

7. A method, comprising:
initiating a charge cycle of a voltage regulator circuit that includes a switch node coupled to a regulated power supply node via an inductor;
in response to initiating the charge cycle:
generating a control current using a voltage level of the regulated power supply node and a reference voltage level;
generating a compensation current;
converting the compensation current into a correction voltage;
generating a filtered correction voltage by sampling and filtering the correction voltage and
generating a correction current using the filtered correction voltage; and
halting the charge cycle using the control current, a sensed inductor current, the compensation current, and the correction current.

8. The method of claim 7, further comprising, subtracting the correction current from a sum of the sensed inductor current and the compensation current.

9. The method of claim 7, wherein converting the compensation current into the correction voltage includes:
generating a first voltage level using the compensation current, and
charging a first capacitor, using the first voltage level, during a first time period to generate a sampled voltage level.

10. The method of claim 9, further comprising, filtering, using a second capacitor during a second time period subsequent to the first time period, the sampled voltage level to generate filtered correction voltage.

11. The method of claim 7, further comprising, amplifying a difference between the voltage level of the regulated power supply node and the reference voltage level to generate the control current.

12. The method of claim 7, further comprising, initiating the charge cycle, in response to an assertion of a clock signal.

13. The method of claim 12, further comprising, initializing the correction current during a particular cycle of the clock signal.

14. An apparatus, comprising:
a voltage regulator circuit including a switch node coupled to a regulated power supply node via an inductor, wherein the voltage regulator circuit is configured to source a charge current to the switch node, in response to an activation of a control signal;
a latch circuit configured to activate the control signal;
an error amplifier circuit configured to generate a control current using a voltage level of the regulated power supply node and a reference voltage;
a compensation circuit configured to:
convert a slope current into a correction voltage;
sample and filter the correction voltage to generate a filtered signal;
generate a correction current using the filtered signal; and
add the slope current to and subtract the correction current from a sensed inductor current to generate a compensated inductor current, wherein a value of the correction current is based on a value of the slope current;
a comparator circuit configured to assert a reset signal using the compensated inductor current and the control current; and
wherein the latch circuit is further configured to deactivate the control signal in response to an activation of the reset signal.

15. The apparatus of claim 14, wherein the compensation circuit includes a first device configured to generate a first voltage level using the slope current.

16. The apparatus of claim 15, wherein the compensation circuit further includes a first switch and a first capacitor, wherein the first switch is configured to selectively couple a control terminal of the first device to the first capacitor to generate a sampled signal.

17. The apparatus of claim 16, wherein the compensation circuit further includes a second switch and a second capacitor, wherein the second switch is configured to selectively couple the first capacitor to the second capacitor to generate the filtered signal.

18. The apparatus of claim 17, wherein the compensation circuit further includes a second device configured to generate the correction current using the filtered signal.

19. The apparatus of claim 14, wherein the latch circuit is further configured to activate the control signal in response to an activation of a clock signal.

20. The apparatus of claim 14, wherein the compensation circuit is further configured to generate in the slope current in response to an activation of a clock signal.

* * * * *